March 30, 1926.                                                         1,578,465
                        A. D. PANOULIAS
                  CANDY COATING AND DECORATING MACHINE
                     Filed July 21, 1921        5 Sheets-Sheet 3
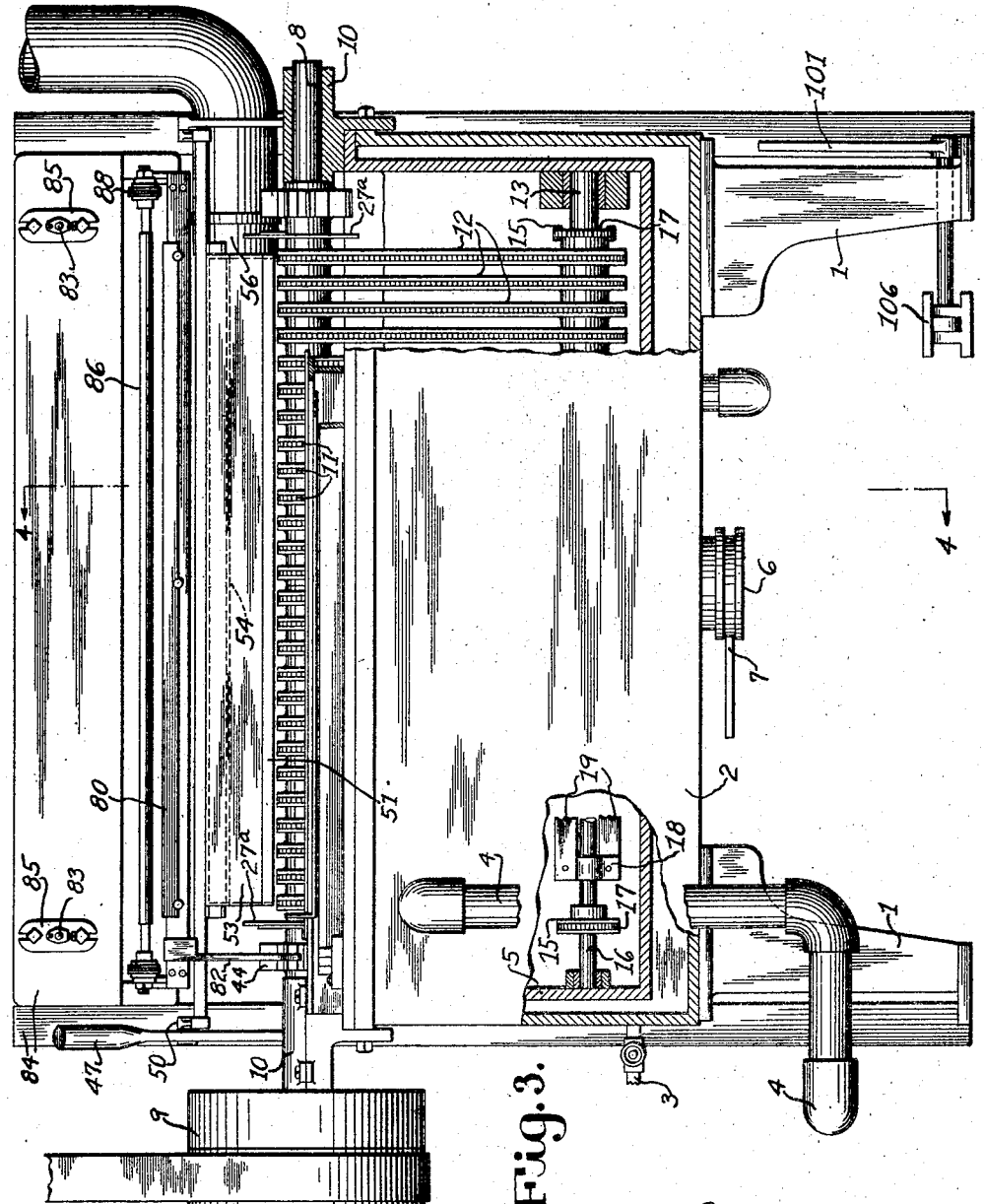

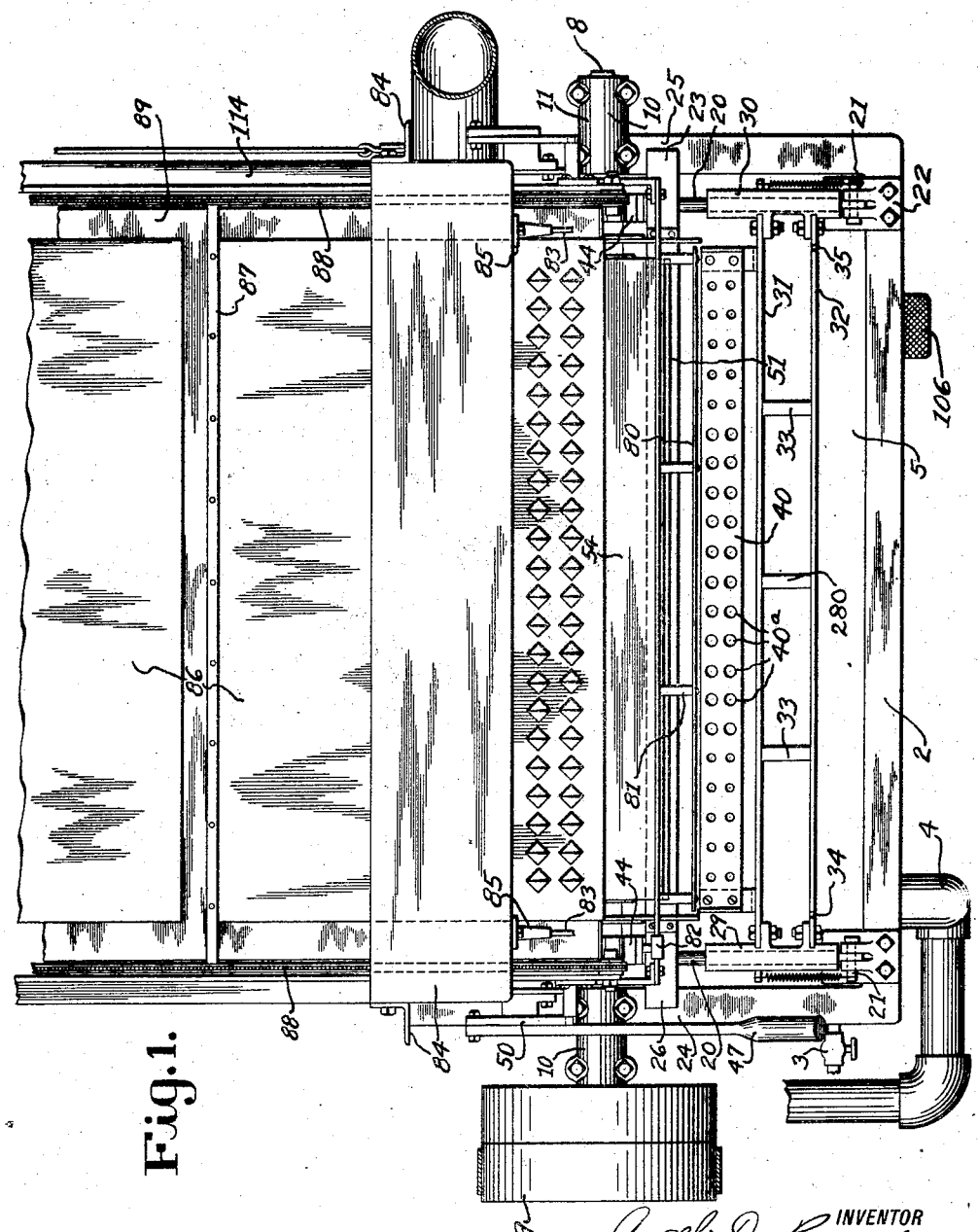

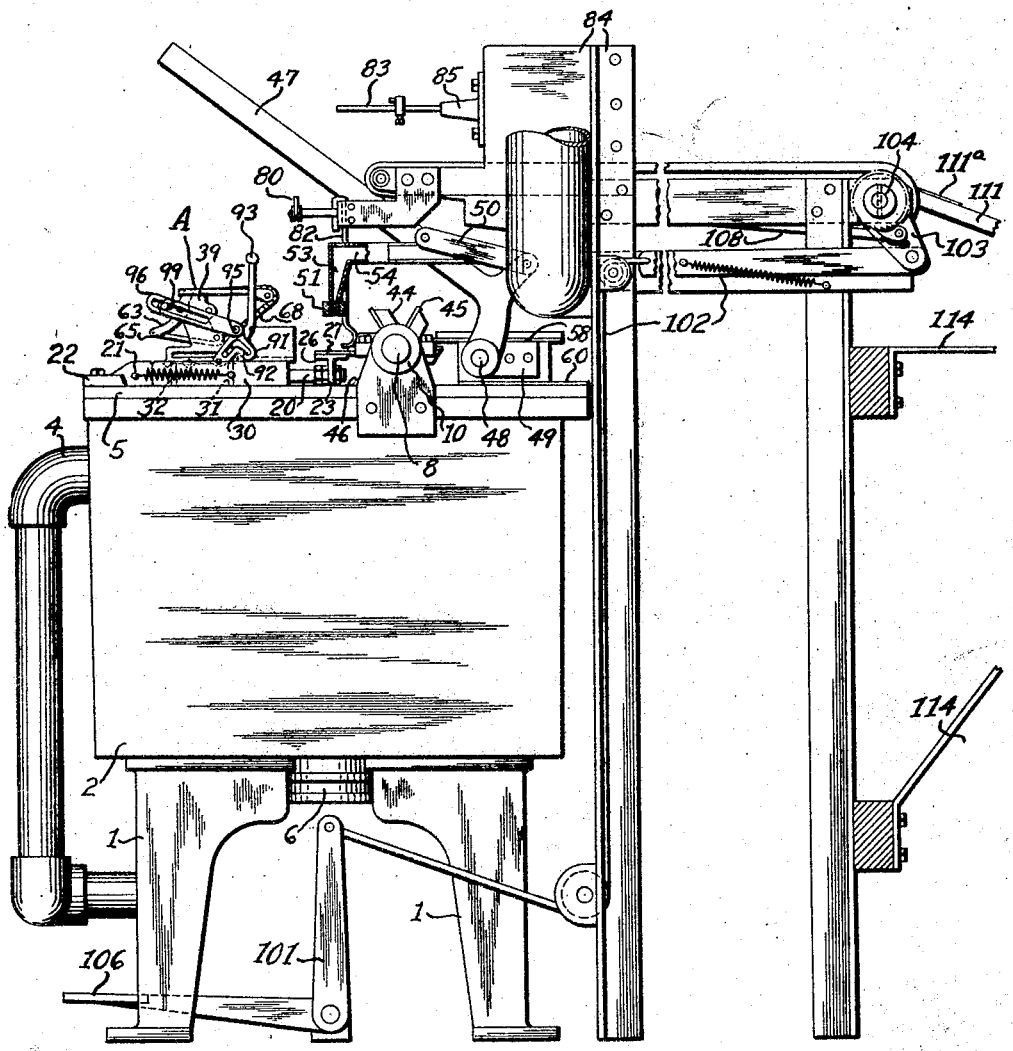

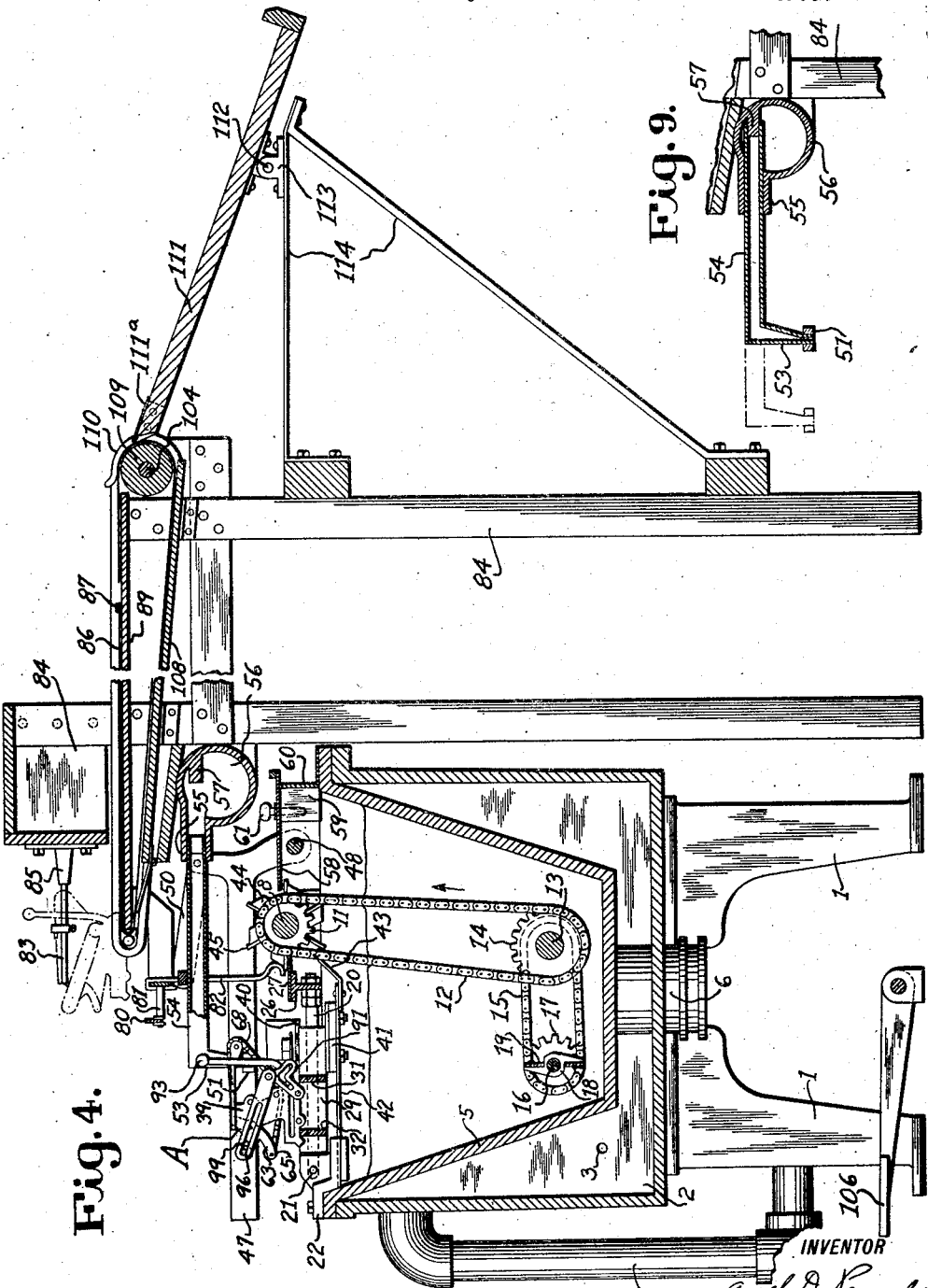

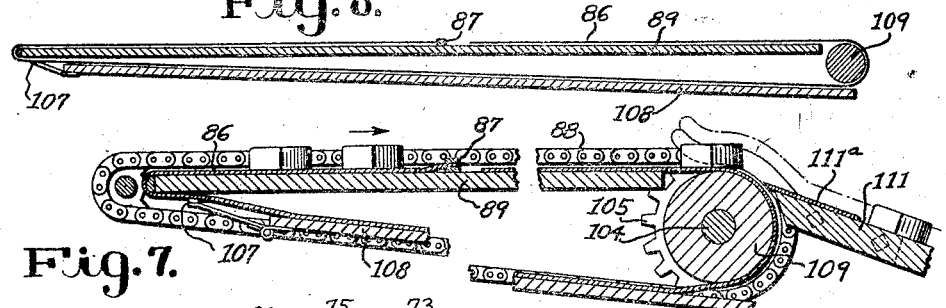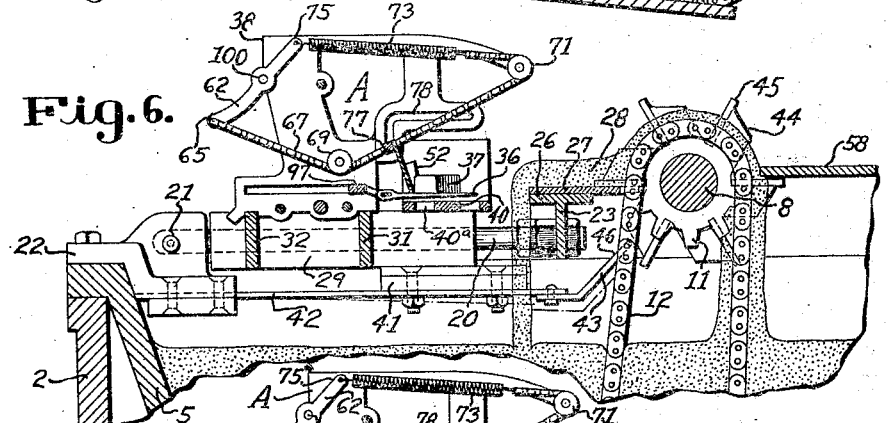

Patented Mar. 30, 1926.

1,578,465

UNITED STATES PATENT OFFICE.

ANGELO D. PANOULIAS, OF JERSEY CITY, NEW JERSEY, ASSIGNOR, BY MESNE ASSIGNMENTS, TO PANAYIOTIS D. PANOULIAS.

CANDY COATING AND DECORATING MACHINE.

Application filed July 21, 1921. Serial No. 486,558.

*To all whom it may concern:*

Be it known that I, ANGELO D. PANOULIAS, a subject of the King of Greece, and a resident of Jersey City, in the county of Hudson and State of New Jersey, have invented a new and useful Candy Coating and Decorating Machine, of which the following is a specification.

This invention relates to apparatus and machinery for coating and decorating caramels, cream centers or other confections with chocolate or the like, and has for its object the provision of a device whereby the coating can be applied in such manner as to be uniform in thickness, evenly distributed on all sides, and whereby the ornamentation or decoration shall be uniform and of a predetermined form and in a predetermined position on the finished article. Other advantages will be brought out more fully in the specification hereto annexed and forming a part hereof.

In the drawings:

Fig. 1 represents a top plan view of the machine;

Fig. 2 represents an end elevation of the same;

Fig. 3 represents a front elevation of the same;

Fig. 4 shows an end elevation taken on the line 4—4 of Fig. 3;

Fig. 5 is a fragmentary section on an enlarged scale showing a frame and confection in coating position;

Fig. 6 is a view similar to Fig. 5, showing a frame and confections prior to the coating position;

Fig. 7 is a sectional view of the unloading apron;

Fig. 8 is a sectional view of the unloading apron and frames;

Fig. 9 is a section of the blower; and

Fig. 10 is a fragmentary elevation showing a frame in the discharge and ornamenting position.

Upon legs or other suitable supports 1 is mounted a steam or hot water chest 2, suitably connected with a source of supply through an inlet pipe 3 and overflow pipes 4. Mounted in the heating chest is a suitable pot or container 5, in which the chocolate or other coating material is raised to the proper melting temperature. For convenience in discharging or emptying this pot, an outlet 6, provided with a control valve 7, is mounted at the lower portion of the pot 5.

A shaft 8 having a suitable driving connection 9 in the form of a pulley securely fastened thereto is mounted in bearings 10 secured in some suitable manner to the steam chest 2. Upon the shaft 8, which extends transversely across the top of the container 5, and revoluble therewith, are mounted a series of sprocket wheels 11 driving sprocket chains 12, which in turn drive a shaft 13 mounted within the lower part of the container 5 and provided with a similar series of sprockets. The sprocket chains are placed close to each other, the series extending across the pot. Secured to one end of the shaft 13 is a sprocket 14, which drives through a chain 15 a shaft 16 mounted within the melting pot through a sprocket 17. The shaft 16 has mounted at either end flanged pieces 18 carrying paddles 19. The action of this mechanism is as follows: Power is applied, as described, to the pulley 9, which in turn rotates the shaft 8 and its series of sprockets 11 which drive the various sprocket chains 12 in an upward direction as indicated by the arrow in Fig. 4. The contents of the kettle or pot 5 being agitated by the paddles 19, mounted as described, the coating material is kept in an agitated condition, which prevents the hardening thereof, and at the same time it is carried to the point of delivery by the various sprocket chains 12. It can be seen that the breakage of one of the plurality of sprocket chains would not in any great degree interfere with the amount of coating material carried upward to the delivery point. Heretofore, among other devices, continuous belts have been employed for the purpose of elevating the coating material from the kettle of candy coating machines, and in the event of the breakage of such belt, which extended from side to side of heating kettle or pot, the entire machine was thrown out of working order.

Mounted upon the receptacle 5, and near either side of the machine, are slides 20 pivotally secured at 21 at their forward ends to suitable bearings 22, the rear ends of such slides being secured to a T-iron 23, which rests upon the sides of the container at 24 and 25. Secured to the top portion 26 of the T-iron 23 and directly in front of the chains 12 where they turn and pass down in front of the sprockets 11, is a table 27, upon which the sprocket chains 12 discharge the coating material, and over which table the coating material flows forward in a horizontal stream 28, as illustrated in Fig. 6.

A carriage 280 having bearings 29 and 30 is mounted upon the slides 20, and is provided with longitudinal strips 31 and 32 securely braced by means of intermediate members 33. This carriage is capable of forward and backward movement relative to the fixed table 27, and is provided with notches 34 and 35 for the accommodation of a dipping or loading frame A, which carries a multiplicity of needles 36, upon which the caramels or other confections to be coated are placed. These needles are relatively slender and leave practically the entire bottom of the confection to be coated, illustrated at 37, exposed.

In the operation of coating, the frame A, which is composed of two end members 38 and 39 suitably braced and extending practically from side to side of the machine, is loaded with confections and placed upon the carriage, above described, whereupon the carriage and the frame are bodily thrust horizontally toward and into the path of the horizontal flow of coating material, such as illustrated in Fig. 5. When this is accomplished, the layer of coating material which is carried up by the sprocket chains 12 and over the sprockets 11, flows down onto and forwardly over the table 27 and onto and over a perforated plate 40, which is directly beneath and slightly separated from the needles and their centers to be coated. The perforations 40ª of this plate are preferably graduated as to size, the smaller perforations being toward either side of the machine and the larger perforations toward the center. As the coating material flows over the plate 40, the confections to be coated are entirely flooded and completely coated with the material, the overflow of the coating material passing through the various perforations back into the kettle. The plate 40 is on or a part of the carriage 280 and consequently moves back and forth with the carriage and dipping frame A, toward and from the stationary table 27, and lies beneath the needles and confections both while being flooded and after. This plate forms an extension of the bed of the stream when the candy centers are moved toward the stream, and causes the latter to advance and submerge the centers. When the carriage, frame and centers are retracted, the plate holds a certain amount of the coating material beneath the pieces and, aided by the vibration about to be referred to, insures the proper coating of these regions. The spoons 52 behind the pieces sustain the latter against displacement by the stream while being flooded. The elevator formed by the chains 12 by virtue of its nature has an important effect upon the coating material, working it and delivering it in such state as to produce a superior coating upon the centers.

To secure a uniform coating on the confection, to more rapidly get rid of the overflow, and to prevent air bubbles forming pits on the confection, mallets 41, suitably mounted on springs 42 secured to the lower portion of the bearings 22, are provided. These mallets are operated by the cooperation of a bent-up cam piece 43 mounted in the path of paddle wheels 44, said paddle wheels having a plurality of faces 45, which in turn strike the upper portion 46 of the cam piece 43. This action causes the spring 42 to be downwardly deflected until the cam piece 46 passes beyond the confines of the paddle 45, whereupon it rebounds, striking onto the bottom of the bearings 29 and 30. As the speed of the paddle wheels 44 is considerable, a vibratory motion is imparted to the entire slides, carriage and frame for the purpose outlined. The loose or pivotal mounting at 21 contributes to this effect, though it will be understood that the actual range of movement is very slight. To prevent the chocolate or other coating material overflowing sidewise to too great a degree, disks 27ª are mounted on shaft 8.

After this coating process is completed, the carriage is drawn forward to the position shown in Fig. 6, whereupon, by means of a lever 47 pivoted at 48 to a plate 49 secured to the side of the heating kettle and through a link 50, a transverse elongated nozzle 51 is brought and traversed from the rear directly over the coated confections, whereupon the excess chocolate or other coating material is blown off and the balance is uniformly distributed over the top and sides of such confections.

The slot nozzle 51, previously mentioned, projects downward from a rectangular pipe 53 extending entirely across the operating portion of the machine and on the forward end of a horizontal duct 54 of the same width, such duct sliding or telescoping in an opening 55 of a stationary duct 56 mounted on the frame of the machine and connected with a source of air supply. At the rearward end of this duct 56 is a rectangular closure member 57 adapted to fit within the orifice of the duct 54. With this structure, it can plainly be seen that when the nozzle 51 is in its rearward, inoperative position the closure member 57 is introduced into the end of the pipe 54, entirely shutting off any air from the nozzle piece, and that upon drawing the nozzle and its pipe forward the rear end of the pipe 54 is opened and a communication is established between the nozzle 51 and the source of air supply.

The amount of chocolate or other coating material to be delivered to the table 27 is regulated, according to the size of the confection to be coated and also according to the thickness of the coating to be applied, by a baffle plate 58 adjustably and slidably mounted on blocks 59 secured to an angle-iron 60 mounted on the container 5, so as to be movable into varying degrees of proximity to the rear or upgoing courses of the elevator chains 12. The mounting of this baffle plate may be in any conventional manner, but for the purpose is shown as having elongated slots and securing means, such as the screws 61 illustrated.

The frame A, as previously mentioned and comprising end members 38 and 39 suitably braced, has mounted between such end members double-armed levers 62 and 63, the lever 63 being provided with the additional bell-crank arm 64. Secured to the ends 65 and 66 of said levers are sprocket chains 67 and 68 running over wheels 69, 70, 71 and 72, the free ends of said chains being secured to springs 73 and 74 attached to the ends 75 and 76 of said levers 62 and 63, the purpose of these springs 73 and 74 being to prevent any jar or shock. Secured to the chains 67 and 68 is a bar 77 extending the entire length between the end members 38 and 39 and having at its extreme ends trunnions running in grooves 78 and 79. The rod 77 has secured to it a plurality of spoons 52, so spaced apart as to correspond with the spacing of the needles 36; in other words, the needles are so grouped that one confection is placed immediately in front of each one of the spoons 52.

After the confection is coated and the frame and carriage have been returned to the position illustrated in Figs. 4 and 6, the entire frame is bodily lifted from the carriage and the loaded needles are moved across, in a rearward and forward movement, a scraper 80 flexibly mounted on arms 81 projecting from the frame, said scraper being agitated or vibrated through a cam piece 82 cooperating with the same paddle wheel 44 previously mentioned. This drawing of the dipping frame over the scraper 80 removes all the whiskers of coating material hanging below the needles 36.

After the scraping operation, the frame is suspended on rods 83 mounted at either end of the upper portion 84 of the framework of the machine, on suitable brackets 85 secured to said framework, said brackets being adjustable up and down. When the frame is in this position the needles carrying their burden of chocolate-coated confections are slightly above a rearwardly extending apron 86, which apron is secured at one of its ends to a bar 87 carried between sprocket chains 88 and sliding along a table 89 carried by the frame of the machine, one end of said apron being free.

Pivotally mounted at 90 to the end member 39 is a cam lever 91 comprising a cam slot 92, so formed as to be a working cam for a portion of the movement and an idling cam for the balance of the movement. This cam lever is provided with an operating handle 93 in a pivot-bearing extension 94, to which is pivotally mounted at 95 a slotted link 96. The needles 36 are mounted on a bar 97 having trunnions 98 on either end thereof, said trunnions extending into the cam slot 92 of the lever 91.

In Fig. 4 this mechanism is shown in its normal position in full lines when mounted upon the carriage and in broken lines when mounted in discharge position. In Fig. 10 this mechanism is illustrated in the position assumed by moving the handle piece 93 from the position shown in Fig. 4 to that shown in Fig. 10. During this movement the operation of the various parts is as follows:

For a portion of the movement the rod or bar 97 is moved forward through that portion of the cam slot 92 adapted for that purpose. This movement withdraws the needles carrying the coated confections from beneath such confections, the confections meanwhile being retained in their relative position by means of the spoons 52, whereupon said coated confections are deposited upon the apron 86. For the balance of the movement of the handle lever 93 the needle bar remains stationary, but the link 96 pulls on a pin 99 mounted on the bell-crank 64, which in turn partly rotates the double-arm levers 62 and 63, such levers being secured to a common shaft 100 mounted in the end plates 38 and 39. The partial rotation of the levers 62 and 63 pulls upon the springs 73 and 74, and consequently upon the chains 67 and 68, which in turn impart a movement to the spoon-carrying bar 77. During the first portion of this movement the bar 77, through the trunnions on its ends cooperating with the slots 78 and 79, moves in an upward direction carrying the spoons 52 therewith, and during the balance of the movement the bar 77 travels in a rearwardly direction. During both portions of the movement the chocolate or other coating substance between the confection to be coated and the spoon runs from said spoon and onto the confection, thereby depositing what is known as a string over the top of said confection. It can clearly be seen that by a variation of this movement, various and curious designs of strings may be placed upon the tops of such coated confections.

After a row of confections have been deposited upon the apron 86, such apron is advanced a suitable distance through a bell-crank foot lever 101 at the front of the machine, and suitable linkage 102, to a ratchet and pawl mechanism 103 mounted on the end of a shaft 104 in the upper part of the frame, carrying suitable sprockets 105 for cooperation with the sprocket chain 88. One step upon the foot-piece 106 of the bell-crank lever advances the apron a distance suitable and equal to the space between one row of confections deposited and the next row. Wider spacing can be secured by depressing the treadle two or more times, as may be desirable for large pieces. As previously mentioned, one end of the apron 86 is secured to a block 87, while the other end is left free; this is for the purpose of compensating for any inequalities in the belting material and for the purpose of keeping such portions of the belt upon which the confections are deposited smooth and free from wrinkles. This purpose is further accomplished by a spring-pressed bar 107 mounted at one end of a board 108, over which the slack of the belt is drawn. The loose end of the apron passes over a roll 109 mounted on the shaft 104. A piece of partially circular section 110 is mounted upon a receiving table 111 pivoted at 112 in suitable bearings 113 mounted upon a frame 114 secured to the frame 84. At the forward end of the receiving table 111 is a doffer plate 111$^a$. By means of this structure, when the bar 87 comes in contact with the inner surface of the partially circular piece 110, said piece is lifted up by such bar 87 and by virtue of the pivot 112 permits the bar to pass around the drum 109 and clear the doffer plate 111$^a$.

The dipping frame A herein shown is not new per se, being covered by Patent #855,804 dated June 4, 1907, to P. Panoulias, but as will be apparent, is now employed in a different manner and as a part of a machine wherein the centers are flooded instead of being dipped.

What I claim as new is:

1. In a machine of the character described, the combination of means for directing molten coating material in a horizontal stream, means for introducing a plurality of caramels or other confections into said horizontal stream, means for removing the excess coating material from the bottoms of said confections, together with means for ornamenting and means for discharging said confections onto a receiving means.

2. In a machine of the character described, the combination of means for directing molten coating material into a horizontal stream, a loading frame carrying means for supporting a plurality of confections, said means being so arranged as to leave substantially the entire bottoms of said confections exposed, a perforated plate carried by said loading frame, means for removing the excess coating material from the bottoms of the said confections, together with means for ornamenting and means for discharging said coated confections onto an apron.

3. In a machine of the character described, a receiving apron having one free end, means for smoothing said apron, together with means for advancing said apron.

4. In a machine of the character described, the combination of coating and ornamenting means, of means for discharging a plurality of coated and ornamented confections onto an apron having one free end, means for smoothing said apron and means for advancing said apron.

5. In a machine for coating caramels or other confections with chocolate or other coating material; the combination of means for coating a plurality of caramels or other confections, means for discharging said confections onto an apron, said apron having one end free, the other end of said apron being secured to a rod or the like, said rod being fastened at its ends to sprocket chains, together with means for driving said sprocket chains.

6. In a machine for coating caramels or other confections with chocolate or other coating material; the combination of means for coating a plurality of caramels or other confections, means for discharging said confections onto an apron, said apron having one end free and the other end of said apron being secured to a rod or the like, said rod being fastened at its ends to sprocket chains, means for driving said sprocket chains, together with means for removing said caramels or other confections from the apron onto a receiving table, comprising a pivotally mounted table having a doffer plate secured at one end and means for swinging said doffer plate and receiving table out of the path of the apron-carrying rod.

7. In a machine for coating caramels or other confections with chocolate or other coating material; the combination of means for coating a plurality of caramels or other confections, means for discharging said confections onto an apron, said apron having one end free and the other end of said apron being secured to a rod or the like, said rod being fastened at its ends to sprocket chains, means for driving said sprocket chains, means for holding said apron smooth and taut, together with means for removing said caramels or other confections from the apron onto a receiving table, comprising a pivotally mounted table having a doffer plate secured at one end and means for swinging said doffer plate and receiving table out of the path of the apron-carrying rod.

8. In a machine for coating caramels or other confections with chocolate or other coating material; the combination of means for applying molten coating material onto a plurality of confections, a source of air supply, a nozzle connected to said air supply whereby said nozzle is closed in the inoperative position and open in the operative position, means for ornamenting said confections, together with means for discharging said confections onto a receiving apron.

9. In a machine for coating caramels or other confections with chocolate or other coating material; the combination of means for agitating molten chocolate or other coating material in a container, a plurality of closely spaced together elevator means, means for directing the molten coating material into a horizontal stream, means for advancing a plurality of caramels or other confections mounted with all sides substantially exposed, means for vibrating said confections during and after immersion in the coating material, together with means for projecting a current of air onto said coated confections.

10. In a machine for coating caramels or other confections with chocolate or other coating material; the combination of means for coating a plurality of caramels or other confections, of means for vibrating said confections, together with a nozzle having a rectangular orifice and connected with a source of air supply through a rectangular pipe, said pipe sliding in a rectangular orifice and cooperating with a rectangular plug mounted in said air chamber.

11. In a machine for coating caramels or other confections with chocolate or other coating material; the combination of means for introducing a row of caramels or other confections into a stream of molten coating material, means for withdrawing said confections from said stream, together with means for simultaneously moving a plurality of air nozzles connected to a source of air supply through a plurality of round pipes sliding in round orifices in the air chamber, said round pipes cooperating with round plugs mounted in said chamber, during which motion air is projected on said confections.

12. A method of coating caramels or other confections with chocolate or other coating material consisting of introducing a row of confection into a horizontally flowing stream of coating material, vibrating said confections while immersed in the stream of coating material, vibrating the row of confections after withdrawal from the coating stream, and simultaneously projecting a current of air on said coated confections.

13. In a confectionery coating machine the combination with the kettle, of a row of narrow endless elevator belts therein for raising the coating material.

14. In a confectionery coating machine, the combination with the kettle, of a row of sprocket chains and driving means for raising the coating material.

15. In a confectionery coating machine, a movable blower nozzle and means for moving the same across the coated confections.

16. In a confectionery coating machine, the combination of a support for the freshly coated confections, a downwardly directed blower nozzle movably supported so as to pass across the confections, and means for reciprocating the blower nozzle.

17. In a confectionery coating machine, means for supporting and means for supplying a horizontally flowing stream of coating material, a horizontally reciprocable carriage movable toward and away from the front of the stream, and a support for the centers on said carriage, whereby the centers are carried into the path of and flooded by a horizontal stream.

18. In a confectionery coating machine, means for supporting and means for supplying a horizontal stream of coating material, a horizontally reciprocable carriage movable toward and away from the front of the stream, and a support for the centers on said carriage, whereby the centers are carried into the path of the stream and flooded, together with a perforated bottom plate beneath the place where the centers are supported and which moves back and forth with the carriage and support.

19. In a confectionery coating machine, means for supporting and means for supplying a horizontal stream of coating material, a horizontally reciprocable carriage movable toward and away from the front of the stream and a support for the centers on said carriage, whereby the centers are carried into the path of the stream and flooded, together with means behind the centers sustaining the same against the stream.

20. In a confectionery coating machine having a kettle or container for the molten coating material, an elevator for raising coating material from the body of material in the kettle comprising a row of sprocket chains side by side and means for supporting and driving the same.

21. In a confectionery coating machine, the combination of a kettle or container for the molten coating material, a support above the kettle for the centers to be coated, means for elevating coating material from the kettle comprising a row of sprocket chains side by side with means for supporting and driving the same, and means for flooding the centers on their support with the material thus raised.

22. In a confectionery coating machine, the combination of a kettle or container for the molten coating material, a support above the kettle for the centers to be coated, means for elevating coating material from the kettle comprising a row of sprocket chains side by side with means for supporting and driving the same, and means forming a bed onto which the coating material from said chains is delivered in a horizontal stream to flood the centers.

23. In a confectionery coating machine, the combination of a kettle, a horizontally reciprocable support above the kettle for the centers to be coated, an elevator formed by a plurality of endless elements side by side, and a table onto which the material is delivered from the elevator in a horizontal stream in which the centers are flooded.

24. In a confectionery coating machine, the combination of a kettle, a horizontally reciprocable support above the kettle for the centers to be coated, a bottom plate movable back and forth with said support, an elevator formed by a plurality of sprocket chains, a table onto which a stream or sheet of the material is delivered by said elevator, said bottom plate being movable to and from said table, and means for vibrating the bottom plate in both positions.

25. In a confectionery coating machine, the combination of a kettle, a horizontally reciprocable support above the kettle for the centers to be coated, a bottom plate movable back and forth with said support, an elevator formed by a plurality of sprocket chains, a table onto which a stream or sheet of the material is delivered by said elevator, said bottom plate being movable to and from said table, and means for vibrating the bottom plate in both positions and for also vibrating the table and said support.

26. In a confectionery coating machine, the combination of a kettle, a horizontally reciprocable support above the kettle for the articles to be coated, an elevator for the coating material, and a table onto the rear of which the material is delivered from the top of the elevator in a horizontal stream or sheet in which the articles which are advanced contrary to the direction of flow are flooded.

27. In a confectionery coating machine, the combination of a kettle, a horizontally reciprocable support above the kettle for the articles to be coated, a bottom plate which moves back and forth with said support lying beneath the centers, an elevator and a table onto which the material is delivered in a horizontal stream or sheet in which the articles are flooded, the bottom plate when in its rearward position forming an extension of the bed of the stream.

28. In a confectionery coating machine, the combination of a kettle, a horizontally reciprocable support above the kettle for the articles to be coated, a bottom plate which moves back and forth with said support lying beneath the centers, an elevator, a table onto which the material is delivered in a horizontal stream or sheet in which the articles are flooded, the bottom plate when in its rearward position forming an extension of the bed of the stream, and vibrating means.

29. In a confectionery coating machine, a support for the articles, a downwardly directed blower nozzle movable back and forth over said support, the nozzle having an air conduit, and a supply conduit or chamber with which the conduit of the nozzle telescopes.

30. In a confectionery coating machine, a support for the articles, a downwardly directed blower nozzle movable back and forth over said support, the nozzle having an air conduit, and a supply conduit or chamber with which the conduit of the nozzle telescopes, together with stationary means in the supply chamber for closing the entrance to the nozzle conduit when the same is in its rear position.

31. In a confectionery coating machine, a framework, a loading frame, a reciprocable carriage on the framework upon which the loading frame can be placed to be carried back and forth and from which it can be lifted, a kettle, means for elevating coating material from the kettle, means for receiving the elevated material in a horizontally flowing stream or sheet, a vibrating scraper bar mounted on the framework, and means for driving the elevator and for vibrating said bar.

32. In a confectionery coating machine, the combination with a framework, a loading frame, flooding means, and means for carrying the loading frame to and from the flooding means, of a vibrating scraper bar on the framework over which bar to draw the loading frame with its coated centers.

ANGELO D. PANOULIAS.